(12) United States Patent
Lin et al.

(10) Patent No.: US 11,598,365 B2
(45) Date of Patent: Mar. 7, 2023

(54) HINGE WITH DOUBLE SYNCHRONOUSLY ROTATABLE AXLES

(71) Applicant: FOSITEK CORPORATION, New Taipei (TW)

(72) Inventors: Chun-Han Lin, New Taipei (TW); Yung-Chih Tseng, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 134 days.

(21) Appl. No.: 17/365,657

(22) Filed: Jul. 1, 2021

(65) Prior Publication Data

US 2022/0341463 A1  Oct. 27, 2022

(30) Foreign Application Priority Data

Apr. 21, 2021 (TW) ................................. 110114287

(51) Int. Cl.
| | |
|---|---|
| *F16C 11/04* | (2006.01) |
| *G06F 1/16* | (2006.01) |
| *E05D 11/00* | (2006.01) |
| *E05D 3/12* | (2006.01) |
| *E05D 11/08* | (2006.01) |
| *E05D 3/18* | (2006.01) |

(52) U.S. Cl.
CPC ............ *F16C 11/04* (2013.01); *G06F 1/1681* (2013.01); *E05D 3/122* (2013.01); *E05D 3/18* (2013.01); *E05D 11/0054* (2013.01); *E05D 11/087* (2013.01); *E05Y 2201/11* (2013.01); *E05Y 2201/218* (2013.01); *E05Y 2900/606* (2013.01)

(58) Field of Classification Search
CPC ........ F16C 11/04; G06F 1/1681; E05D 3/122; E05D 3/18; E05D 11/0054; E05D 11/087; E05Y 2201/11; E05Y 2201/218; E05Y 2900/606
See application file for complete search history.

(56) References Cited

U.S. PATENT DOCUMENTS

| | | | | |
|---|---|---|---|---|
| 10,303,223 | B2* | 5/2019 | Park ...................... | G06F 1/1681 |
| 10,352,354 | B1* | 7/2019 | Hsu ...................... | G06F 1/1641 |
| 10,401,917 | B1* | 9/2019 | Dai ........................ | G06F 1/1681 |
| 10,480,225 | B1* | 11/2019 | Hsu .......................... | E05D 3/12 |
| 10,545,541 | B1* | 1/2020 | Dighde .................. | F16M 11/06 |
| 10,824,197 | B1* | 11/2020 | Hsu ....................... | G06F 1/1641 |
| 10,845,850 | B1* | 11/2020 | Kang .................... | G06F 1/1652 |
| 11,016,541 | B2* | 5/2021 | Lin ......................... | E05D 3/122 |
| 11,194,366 | B2* | 12/2021 | Cheng ................... | G06F 1/1652 |

(Continued)

*Primary Examiner* — Victor D Batson
*Assistant Examiner* — Matthew J Sullivan
(74) *Attorney, Agent, or Firm* — Burris Law, PLLC

(57) ABSTRACT

A hinge includes a base frame unit and two rotatable axle units. The base frame unit includes a base seat and a protective cover. The base seat has two guideways having upper and lower segments, and two shaft sliding slots. The protective cover has a base wall and two pivot pins. Each axle unit rotatably extends through the base seat, and includes a hinge shaft rotatably extending through the shaft sliding slot, a first rotary member non-rotatably fitted to the hinge shaft, a second rotary member connected with the first rotary member, and a support bracket non-rotatably fitted to the hinge shaft. The first rotary member has a guide key slidably engaged in the guideway. The second rotary member is pivoted to the pivot pin and has an engaging hole for receiving the guide key.

11 Claims, 16 Drawing Sheets

(56) References Cited

U.S. PATENT DOCUMENTS

| | | | |
|---|---|---|---|
| 11,301,006 B2* | 4/2022 | Hsu | G06F 1/1641 |
| 11,353,931 B2* | 6/2022 | Hsu | G06F 1/1681 |
| 11,359,425 B2* | 6/2022 | Chang | G06F 1/1681 |
| 11,447,992 B2* | 9/2022 | Wang | G06F 1/1681 |
| 2020/0291702 A1* | 9/2020 | Hsu | G06F 1/1681 |
| 2020/0293094 A1* | 9/2020 | Liu | H04M 1/0216 |
| 2021/0165466 A1* | 6/2021 | Kang | G06F 1/1652 |
| 2021/0195775 A1* | 6/2021 | Zhao | E05D 3/122 |
| 2021/0207648 A1* | 7/2021 | Chen | H04M 1/022 |
| 2021/0267076 A1* | 8/2021 | Zhang | E05D 11/1014 |
| 2021/0325937 A1* | 10/2021 | Siddiqui | G06F 1/1683 |
| 2022/0011827 A1* | 1/2022 | Kim | G06F 1/1681 |
| 2022/0100238 A1* | 3/2022 | Siddiqui | G06F 1/1681 |
| 2022/0100239 A1* | 3/2022 | Siddiqui | G06F 1/1618 |
| 2022/0120124 A1* | 4/2022 | Quynh | F16C 11/04 |
| 2022/0159109 A1* | 5/2022 | Kang | H04M 1/022 |
| 2022/0179459 A1* | 6/2022 | Wang | F16C 11/045 |
| 2022/0206543 A1* | 6/2022 | Kim | G06F 1/1616 |
| 2022/0206544 A1* | 6/2022 | Park | E05D 3/122 |
| 2022/0210937 A1* | 6/2022 | Yun | H05K 5/0017 |
| 2022/0256721 A1* | 8/2022 | Lin | H05K 5/0226 |

* cited by examiner

US 11,598,365 B2

HINGE WITH DOUBLE SYNCHRONOUSLY ROTATABLE AXLES

CROSS-REFERENCE TO RELATED APPLICATION

This application claims priority of Taiwanese Patent Application No. 110114287, filed on Apr. 21, 2021.

FIELD

The disclosure relates to a hinge for an electronic device, and more particularly to a hinge with two synchronously rotatable axles.

BACKGROUND

A conventional double-axle hinge has two rotatable axle units which are respectively connected with two casing parts of a foldable electronic device and synchronously rotatable to open and close the two casing parts. In such design, a clearance between the two casing parts exists in an opened state for preventing contact and collision of the casing parts during closing and opening operations. It is needed to improve the excess clearance thereof to prevent adverse influence on usage of the foldable electronic device.

SUMMARY

Therefore, an object of the disclosure is to provide a hinge that can alleviate at least one of the drawbacks of the prior art.

According to the disclosure, the hinge includes abase frame unit and two rotatable axle units. The base frame unit includes abase seat that has a first major surface to which an axial direction is normal, and a protective cover which is mounted on an outer peripheral surface of the base seat to cover and conceal the first major surface. The base seat has two guideways which are recessed from the first major surface and formed opposite to each other in a lateral direction that is transverse to the axial direction, and two shaft sliding slots, each of which penetrates through the first major surface in the axial direction. Each of the guideways includes lower and upper segments which are opposite to each other in an upright direction that is transverse to both the axial direction and the lateral direction, and which are located below and above a respective one of the shaft sliding slots, respectively. Each of the shaft sliding slots extends in the lateral direction and has an inner end and an outer end. The protective cover has a base wall which faces and is spaced apart from the first major surface of the base seat in the axial direction, and two pivot pins which extend from the base wall toward the base seat. The rotatable axle units rotatably extend through the base seat. Each of the rotatable axle units includes a hinge shaft which extends in the axial direction and through a respective one of the shaft sliding slots to have first and second shaft end portions that are respectively disposed at two opposite sides of the first major surface, a first rotary member which is non-rotatably fitted to the first shaft end portion of the hinge shaft, a second rotary member which is connected with the first rotary member, and a support bracket which is non-rotatably fitted to the second shaft end portion of the hinge shaft and which extends outwardly and in the lateral direction to have a lateral end. The first rotary member has a rotary body, and a guide key which extends from the rotary body in the axial direction and which is slidably engaged in a respective one of the guideways. The second rotary member has a pivot hole which extends in the axial direction for rotatably receiving a respective one of the pivot pins, and an engaging hole which extends in the axial direction for receiving the guide key. The rotatable axle units are rotatable relative to the base frame unit between an initial position, where the support brackets erect in the upright direction and the lateral ends are close to each other to be respectively located above the hinge shafts, the guide keys are respectively placed in the lower segments of the guideways, and the hinge shafts are respectively placed in the outer ends of the shaft sliding slots, and a first stretched position, where the support brackets are placed horizontally and in the lateral direction and the lateral ends are remote from each other, the guide keys are respectively placed in the upper segments of the guideways, and the hinge shafts are respectively placed in the inner ends of the shaft sliding slots to be closer to each other.

With the rotatable axle units rotatable between the initial position and the first stretched position, rotation of the hinge shafts drives rotation of the first rotary members, and hence brings the second rotary members into pivot rotation, which in turn moves the hinge shafts along the shaft sliding slots so as to generate an appropriate distance between two device parts connected with the support brackets.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
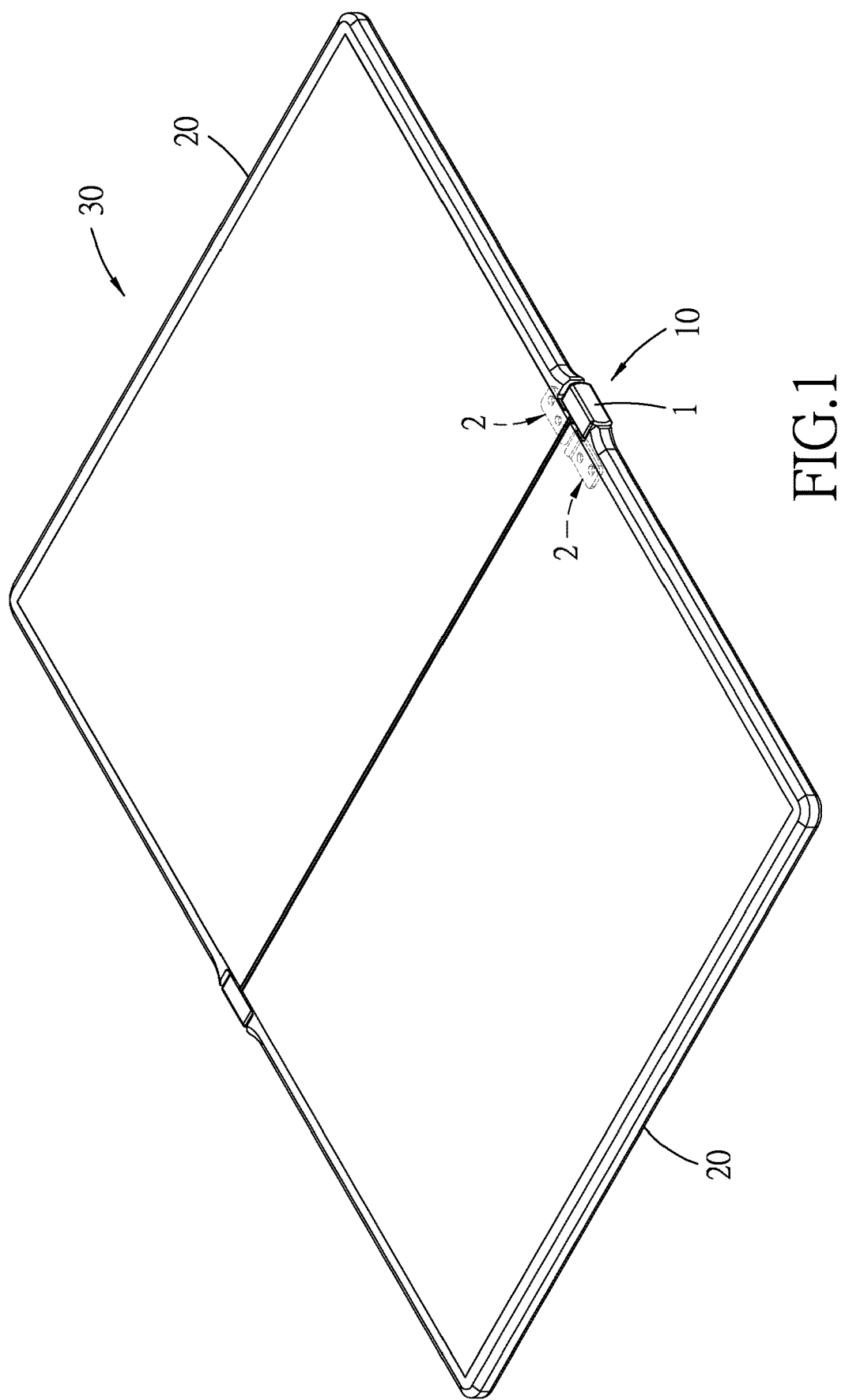
FIG. 1 is a perspective view illustrating an embodiment of a hinge according to the disclosure mounted between two device parts, and illustrating two rotatable axle units of the hinge in a first stretched position and the device parts in a first opened state.
Figure 2:
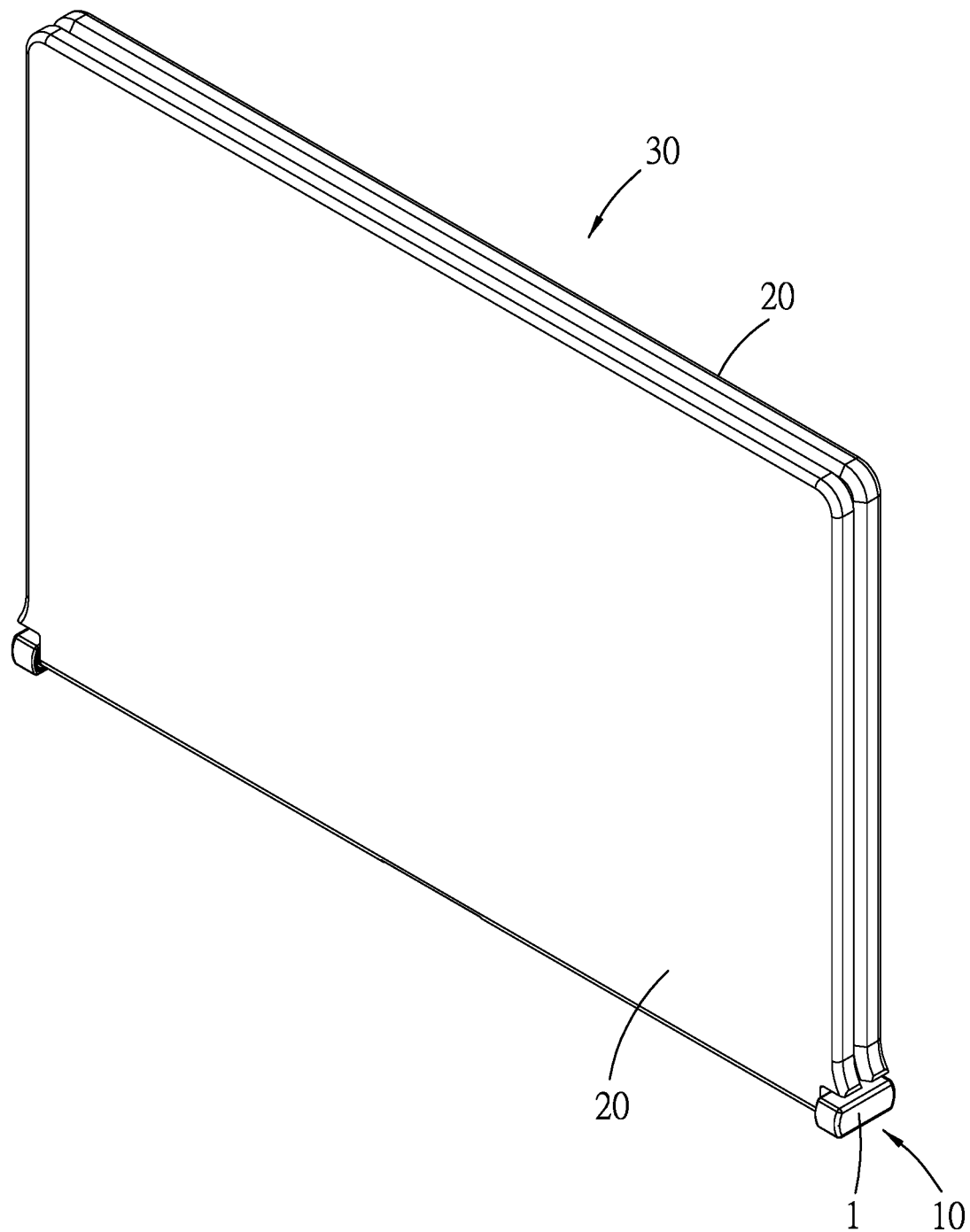
FIG. 2 is a perspective view similar to FIG. 1, illustrating the rotatable axle units in an initial position and the device parts in a closed state.
Figure 3:
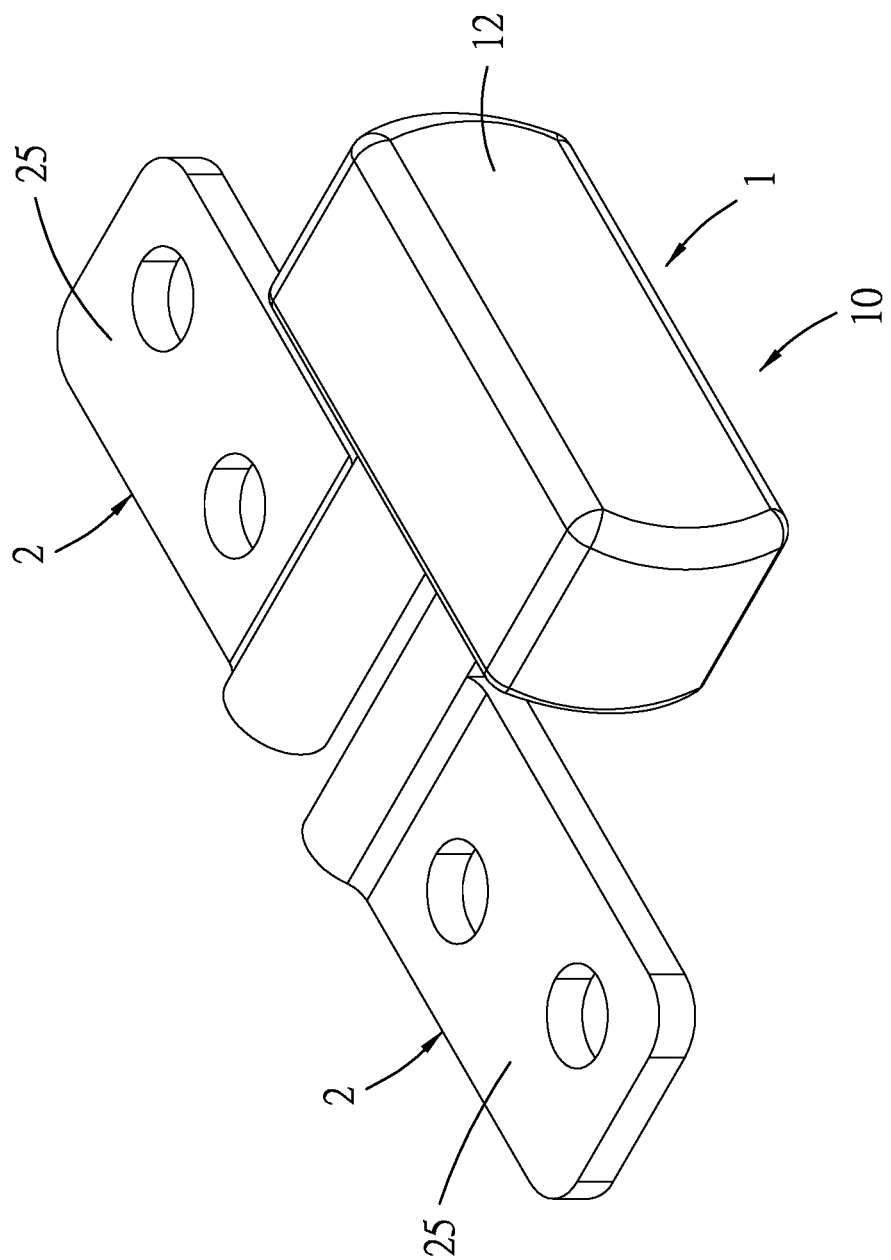
FIG. 3 is a perspective view of the embodiment.

Referring to FIGS. 1 to 3, an embodiment of a hinge 10 according to the disclosure is adapted to be mounted on two device parts 20 of a foldable electronic device 30. The foldable electronic device 30 may be a foldable mobile phone, tablet, tablet PC, or portable PC, or so forth. The hinge 10 of the embodiment includes a base frame unit 1 and two rotatable axle units 2.

Figure 4:
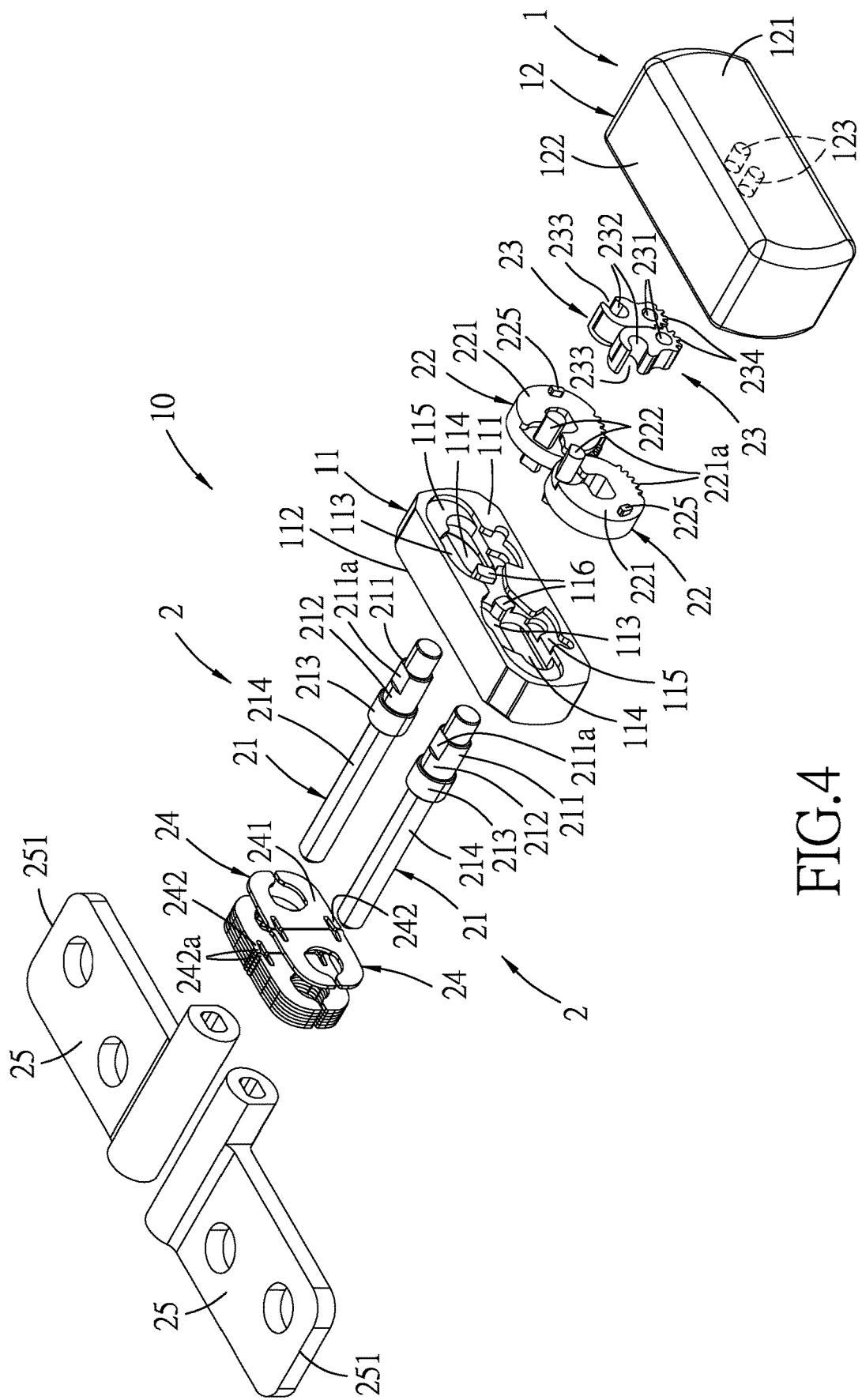
FIG. 4 is an exploded perspective view of the embodiment.
Figure 5:
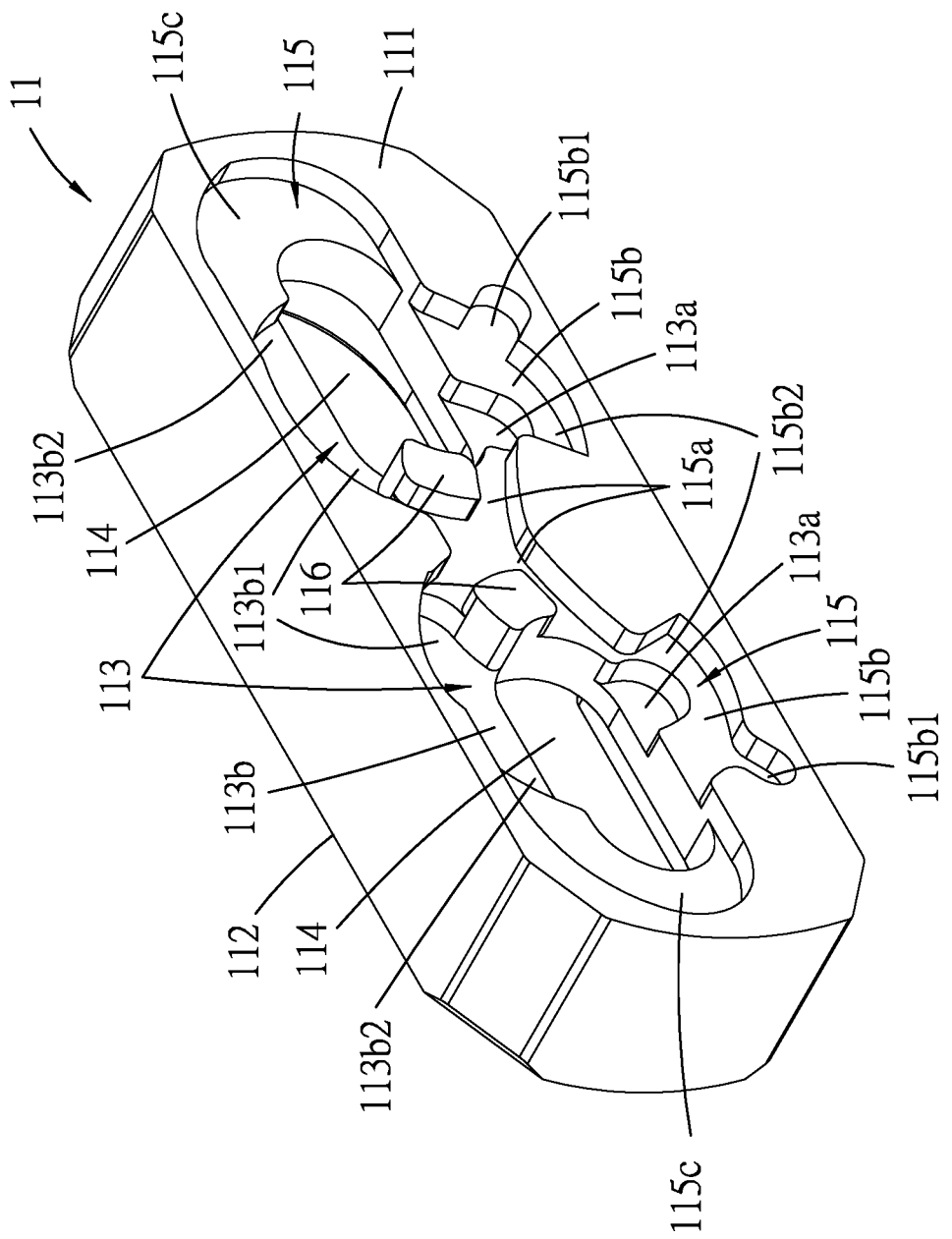
FIG. 5 is a perspective view of a base seat of a base frame unit of the embodiment.
Figure 6:
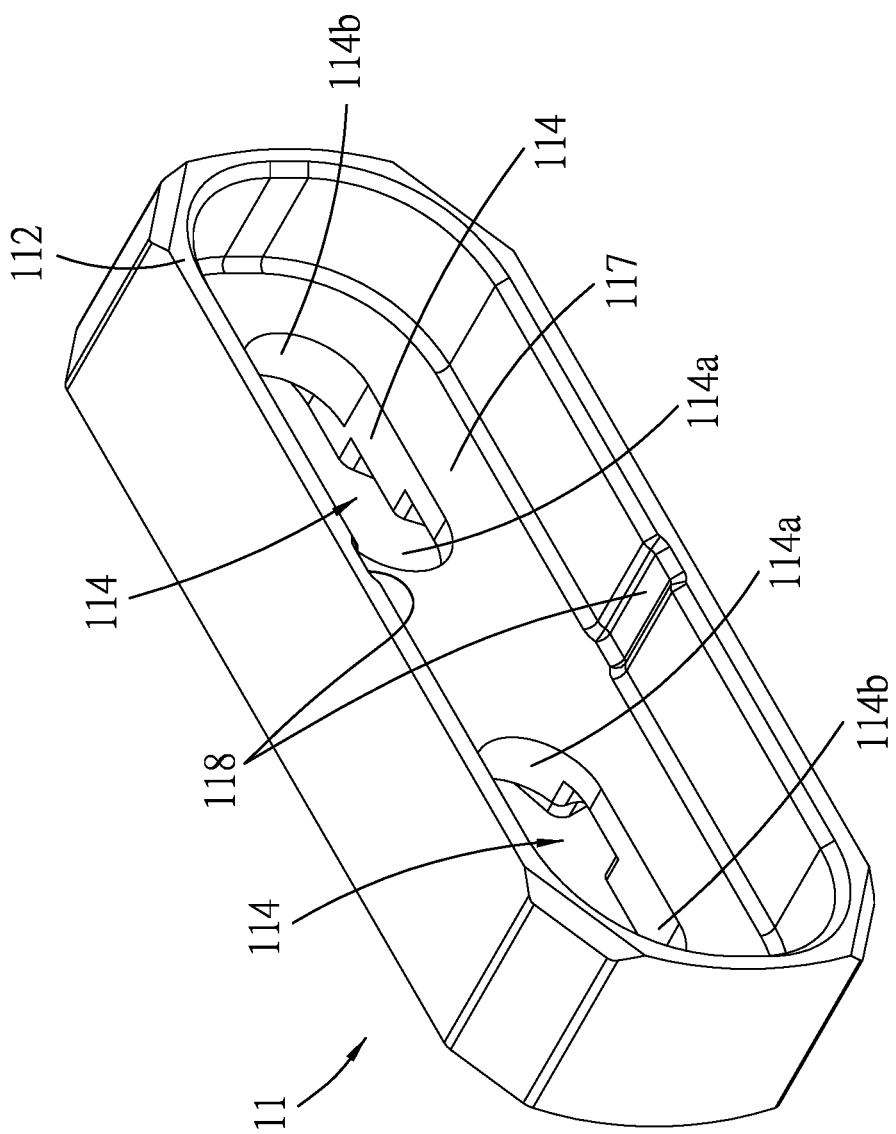
FIG. 6 is a perspective view of the base seat taken from another angle.

With reference to FIGS. 4 to 6, the base frame unit 1 includes a base seat 11 and a protective cover 12 disposed on the base seat 11. The base seat 11 has a first major surface 111, a second major surface 112 opposite to the first major surface 111 in an axial direction, two guideways 113 which are recessed from the first major surface 111 and formed opposite to each other in a lateral direction that is transverse to the axial direction, two shaft sliding slots 114 each of which penetrates from the first major surface 111 to the second major surface 112, two stabilizing slots 115 which are recessed from the first major surface 111, and two abutted blocks 116 which are respectively disposed in the stabilizing slots 115. The base seat 11 further has an accommodation chamber 117 which is recessed from the second major surface 112, and two fit slots 118 which are formed in the accommodation chamber 117 and at upper and lower sides of the accommodation chamber 117, respectively.

Each of the guideways 113 includes lower and upper segments (113a, 113b) which are opposite to each other in an upright direction that is transverse to both the axial direction and the lateral direction and which are located below and above a respective one of the shaft sliding slots 114, respectively. The upper segment (113b) of each guideway 113 has an inward end (113b1) and an outward end (113b2) opposite to each other in the lateral direction. Each of the shaft sliding slots 114 extends in the lateral direction, and has an inner end (114a) and an outer end (114b) opposite to each other. The inner ends (114a) of the shaft sliding slots 114 are proximate to each other and the outer ends (114b) of the shaft sliding slots 114 are distal from each other in the lateral direction. Each of the stabilizing slots 115 has an inboard portion (115a) adjacent to and inwardly of the inner end (114a) of a respective one of the shaft sliding slots 114 in the lateral direction, a lower portion (115b) below the respective shaft sliding slot 114, and an outboard portion (115c) adjacent to and outwardly of the outer end (114b) of the respective shaft sliding slot 114. The lower portion (115b) of each stabilizing slot 115 has a distal end (115b1) and a proximal end (115b2) opposite to each other in the lateral direction. The two abutted blocks 116 are respectively disposed in the inboard portions (115a) of the stabilizing slots 115 (description in detail is provided hereinafter).

Figure 7:
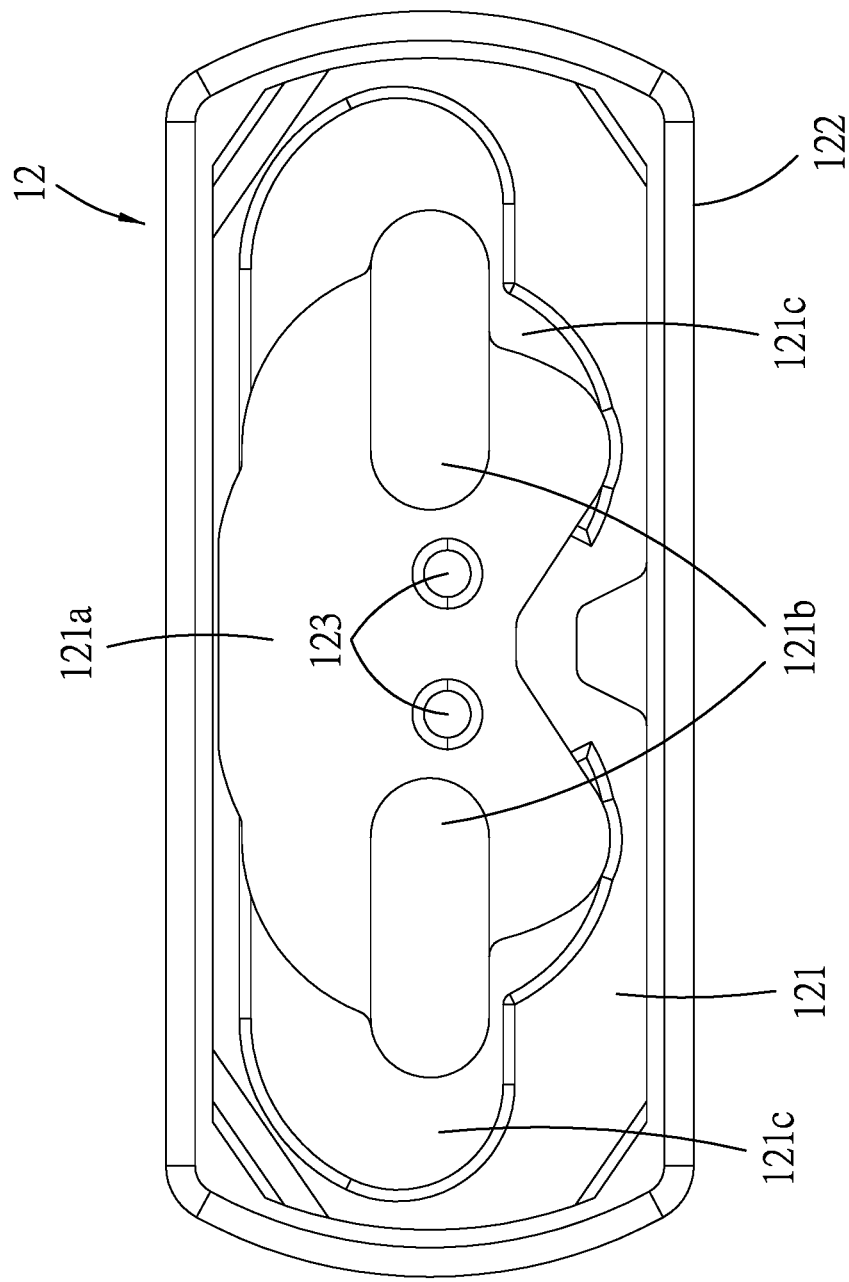
FIG. 7 is a rear view of a protective cover of the base frame unit of the embodiment.

With reference to FIGS. 4 and 7, the protective cover 12 is fittingly mounted on an outer peripheral surface of the base seat 11 to cover and conceal the first major surface 111. The protective cover 12 has a base wall 121 facing and spaced apart from the first major surface 111 of the base seat 11 in the axial direction, a surrounding wall 122 extending from a periphery of the base wall 121 in the axial direction and mounted on the outer peripheral surface of the base seat 11, and two pivot pins 123 which extend from the base wall 121 in the axial direction toward the base seat 11. The protective cover 12 has an accommodation recess (121a) which is recessed from the base wall 121 and facing the base seat 11 to be substantially aligned with the guideways 113 in the axial direction, two auxiliary shaft sliding slots (121b) which are configured to respectively mate and be aligned with the shaft sliding slots 114, and two auxiliary stabilizing slots (121c) which are configured to respectively mate and be aligned with the stabilizing slots 115. In this embodiment, the guideways 113, the shaft sliding slots 114, the stabilizing slots 115, the pivot pins 123, the auxiliary shaft sliding slots (121b) and the auxiliary stabilizing slots (121c) are mirror images of each other and are symmetric to each other with respect of an upright middle line of the base seat 11.

Figure 8:
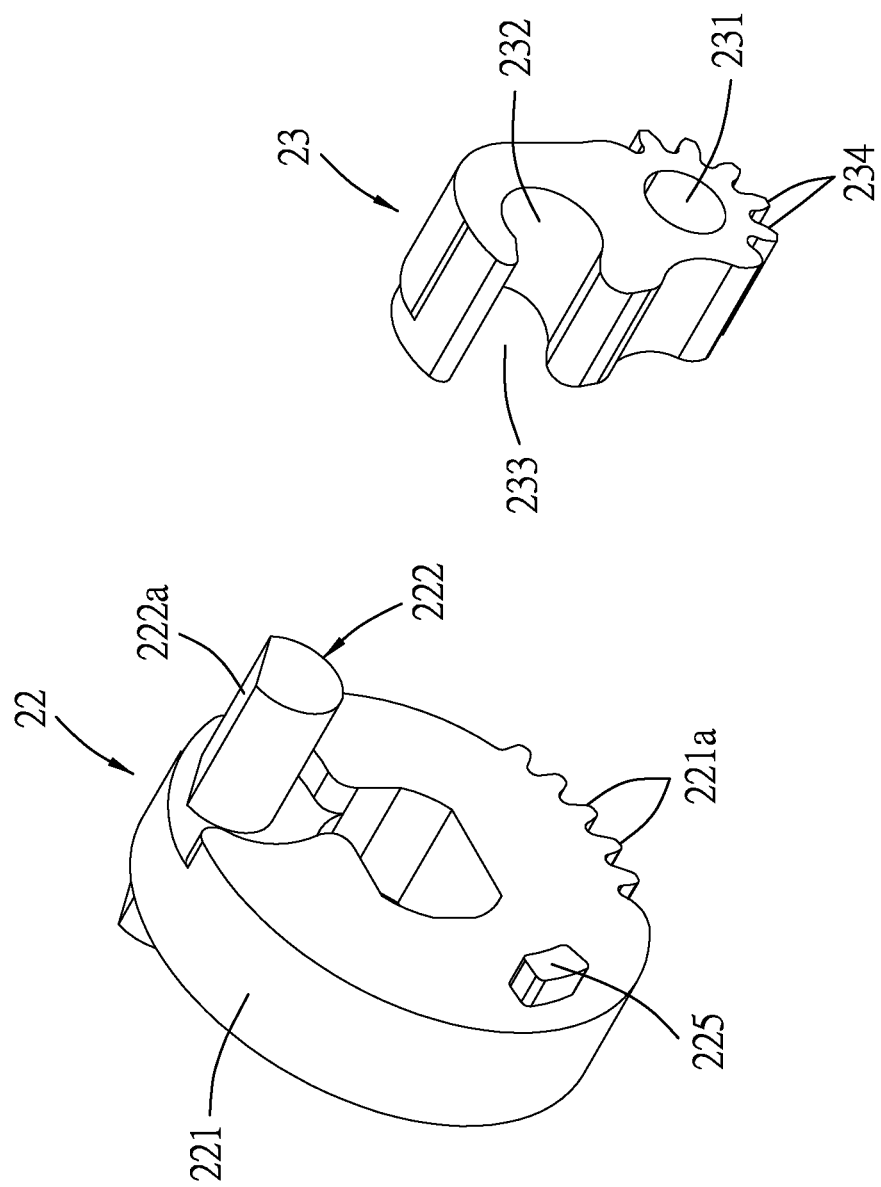
FIG. 8 is a perspective view of a first rotary member and a second rotary member of the rotatable axle unit.
Figure 9:
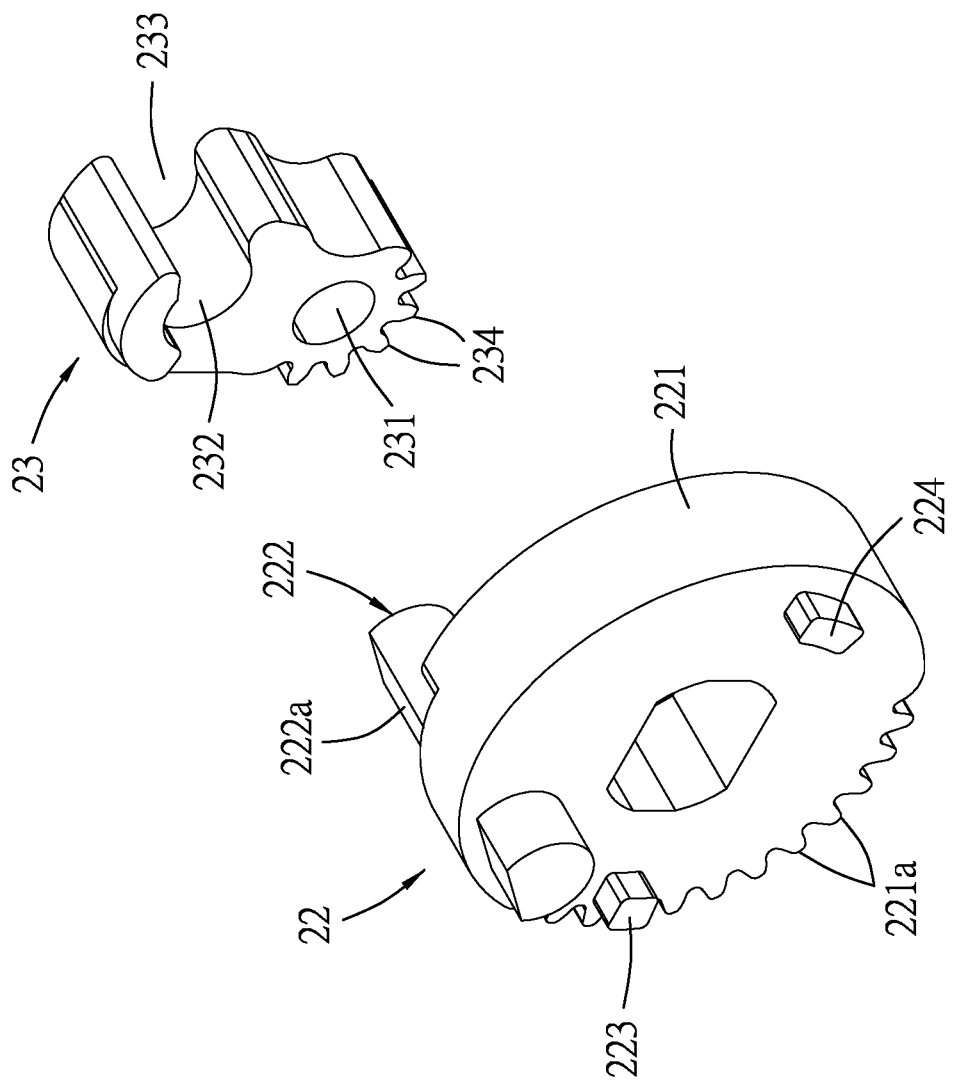
FIG. 9 is a perspective view of the first and second rotary members taken from another angle.
Figure 10:
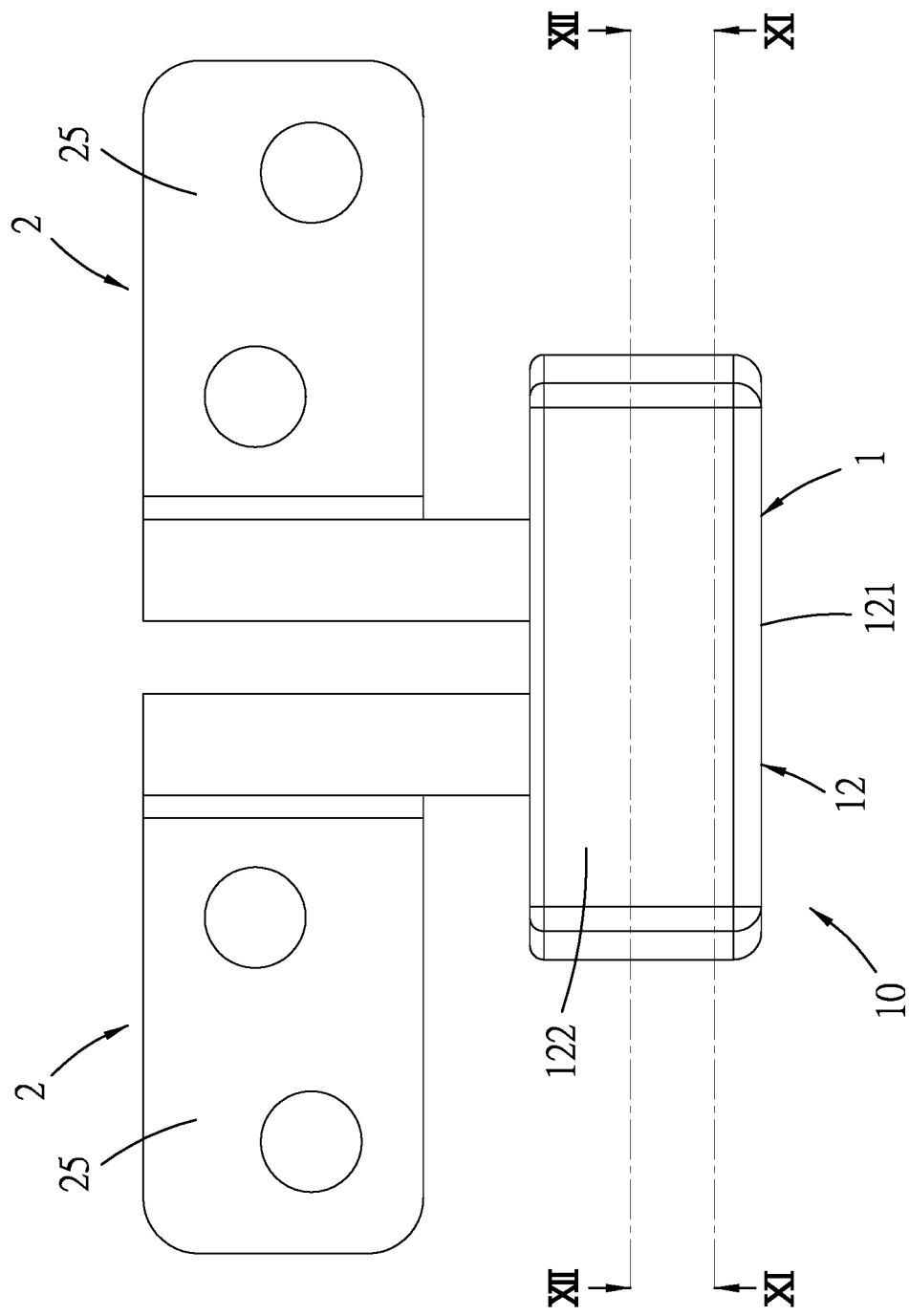
FIG. 10 is a top view of the embodiment.

Referring to FIGS. 4, 8 and 9, the rotatable axle units 2 rotatably extend through the base seat 11. Each of the rotatable axle units 2 includes a hinge shaft 21 which extends in the axial direction and through a respective one of the shaft sliding slots 114 of the base seat 11 to have first and second shaft end portions 211, 214 that are respectively disposed at two opposite sides of the first major surface 111, a first rotary member 22 which has a rotary body 221 that is non-rotatably fitted to the first shaft end portion 211 of the hinge shaft 21, a second rotary member 23 which is connected with the first rotary member 22, a support bracket 25 which is non-rotatably fitted to the second shaft end portion 214 of the hinge shaft 21 and which extends outwardly and in the lateral direction to have a lateral end 251, and a plurality of frictional plates 24 which are sleeved on the hinge shaft 21 and interposed between the base seat 11 and the support bracket 25. Specifically, each hinge shaft 21 has a guided portion 212 and a sleeved portion 213 which are interposed between the first and second shaft end portions 211, 214 and adjoined with each other. The guided portion 212 is slidably inserted into the respective shaft sliding slot 114. The frictional plates 24 are sleeved on the sleeved portion 213. The first shaft end portion 211 of each hinge shaft 21 further extends from the rotary body 221 toward the protective cover 12 and is movably engaged in a respective one of the auxiliary shaft sliding slots (121b). The first shaft end portion 211 of each hinge shaft 21 is in the form of a cylinder having two opposite longitudinal sections (211a) so as to be in spline engagement with the first rotary member 22 to permit rotation with the first rotary member 22. In this embodiment, the sleeved portion 213 has a diameter larger than that of each of the first and second shaft end portions 211, 214.

Each first rotary member 22 has a guide key 222 which non-rotatably extends through the rotary body 221 in the axial direction to have a first key portion that is slidably engaged in the respective guideway 113, and a second key portion that extends toward the second rotary member 23. Each first rotary member 22 further has a first stabilizing block 223 which extends from the rotary body 221 toward the first major surface 111 of the base seat 11 and adjacent to the guide key 222 and which is movably engaged in the respective stabilizing slot 115, and a second stabilizing block 224 which extends from the rotary body 221 toward the first major surface 111 of the base seat 11 and which is angularly spaced apart from the first stabilizing block 223 to be movably engaged in the lower portion (115b) and the outboard portion (115c) of the respective stabilizing slot 115. The rotary body 221 of each first rotary member 22 has an auxiliary stabilizing block 225 which extends toward the base wall 121 of the protective cover 12, which is aligned with the second stabilizing block 224 in the axial direction, and which is movably engaged in the respective auxiliary stabilizing slot (121c). The rotary body 221 of each first rotary member 22 further has a first toothed portion (221a) formed on a part of an outer periphery thereof. The first toothed portions (221a) of the rotary bodies mesh with each other so as to allow synchronous rotations of the first rotary members 22 in opposite directions.

Each second rotary member 23 is rotatably received in the accommodation recess (121a). Each second rotary member 23 has a pivot hole 231 which extends in the axial direction for rotatably receiving the respective pivot pin 123, and an engaging hole 232 which extends in the axial direction for receiving the second key portion of the guide key 222. Each second rotary member 23 further has an opening 233 formed laterally of and in spatial communication with the engaging hole 232. The second rotary member 23 has a second toothed portion 234 formed on apart of an outer periphery that surrounds the pivot hole 231. The second toothed portions 234 of the second rotary members 23 mesh with each other so as to allow synchronous rotations of the second rotary members 23 in opposite directions and about the pivot pins 123, respectively, and to stabilize synchronous rotations of the first rotary members 22 through the engagement of the guide keys 222 with the engaging holes 232 (between an initial position and a first stretched position).

The frictional plates 24 are accommodated in the accommodation chamber 117. Each frictional plate 24 has a pad body 241 which is sleeved on the sleeved portion 213 of the respective hinge shaft 21, and two elastomeric arm portions 242 which are integrally connected with upper and lower ends of the pad body 241. Each elastomeric arm portion 242 is formed with a fitted tip (242a) which is engaged in the respective fit slot 118 so as to position the rotatable axle units 2 relative to the base seat 11. With the frictional plates 24 in frictional engagement with the sleeved portions 213 of the hinge shafts 21, a frictional force is generated during the rotation of the hinge shafts 21 relative to the frictional plates 24. Each support bracket 25 is securely connected to the second shaft end portion 214 of the hinge shaft 21, and has the lateral end 251 connected with the corresponding device part 20 (see FIG. 1).

In a modified embodiment, the auxiliary shaft sliding slots (121b) and the auxiliary stabilizing slots (121c) in the protective cover 12 are dispensed with, and the auxiliary stabilizing blocks 225 of the first rotary members 22 are dispensed with.

Figure 11:
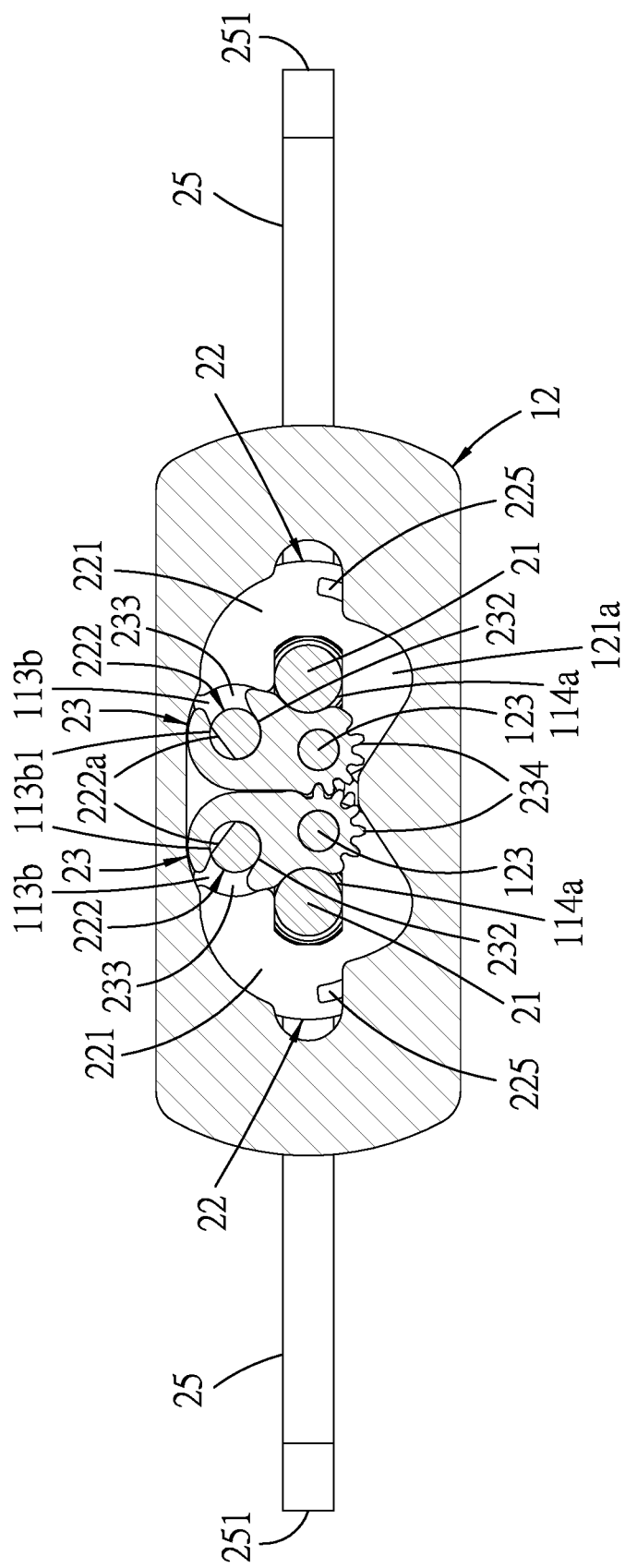
FIG. 11 is a sectional view taken along line XI-XI of FIG. 10, illustrating the rotatable axle units in a first stretched position.
Figure 13:
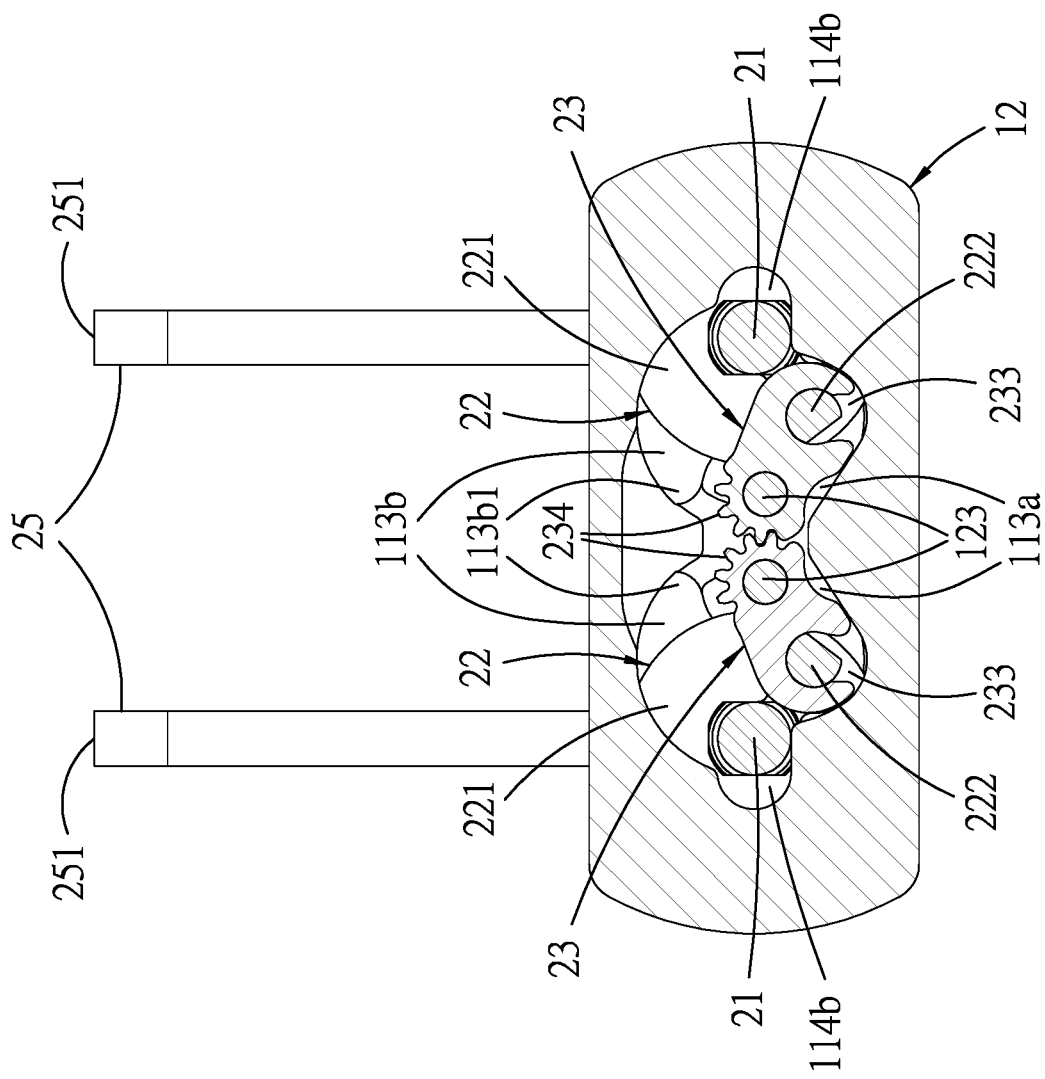
FIG. 13 is a sectional view similar to FIG. 11, illustrating the rotatable axle units in the initial position.
Figure 15:
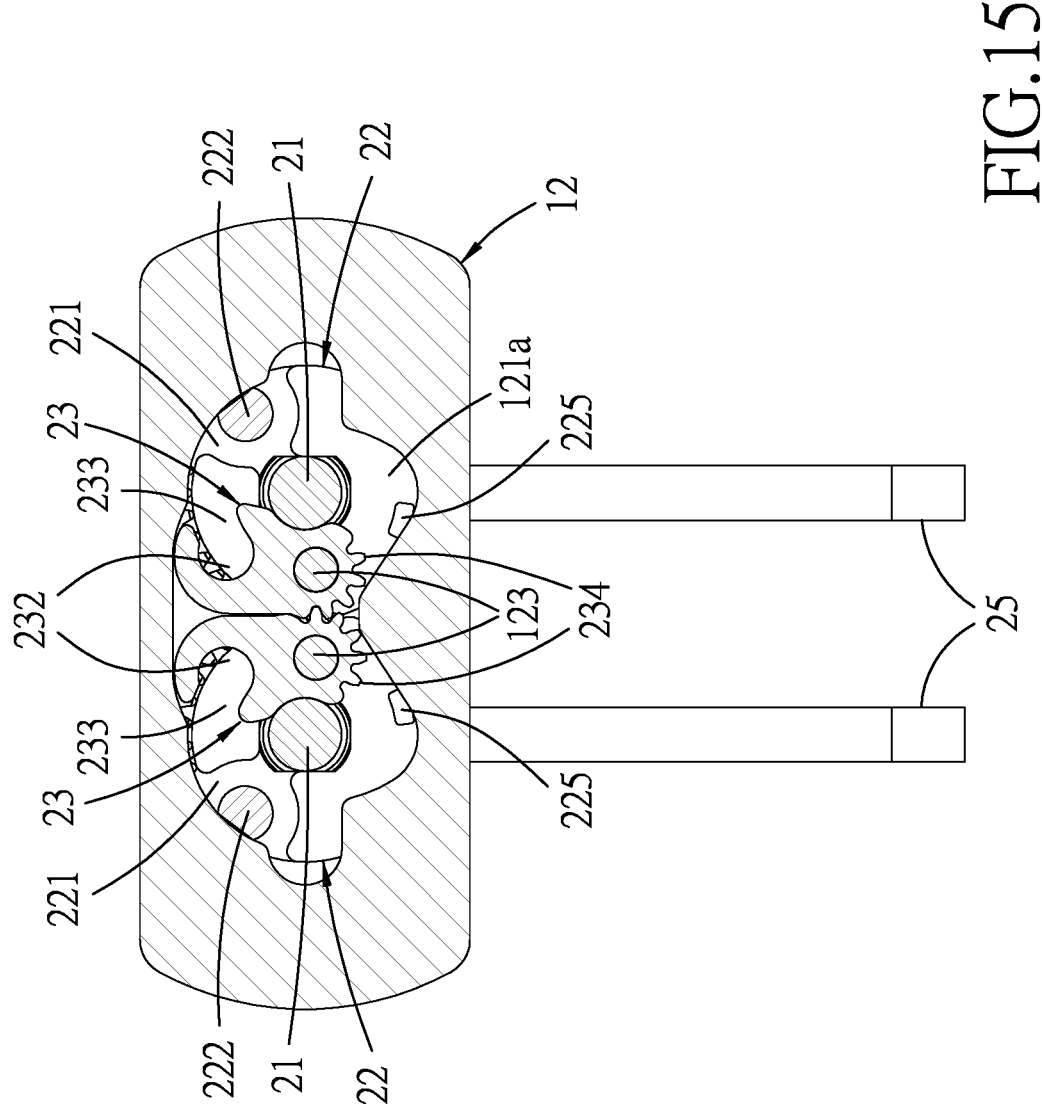
FIG. 15 is a sectional view similar to FIG. 11, illustrating the rotatable axle units in a second stretched position.

With reference to FIGS. 11, 13 and 15, the rotatable axle units 2 are rotatable relative to the base frame unit 1 among an initial position (FIG. 13), a first stretched position (FIG. 11) and a second stretched position (FIG. 15). With rotation of the rotatable axle units 2, the support brackets 25 and the connected device parts 20 are turnable among a closed state (see FIG. 2), a first opened state (see FIG. 1) and a second opened state.

Figure 14:
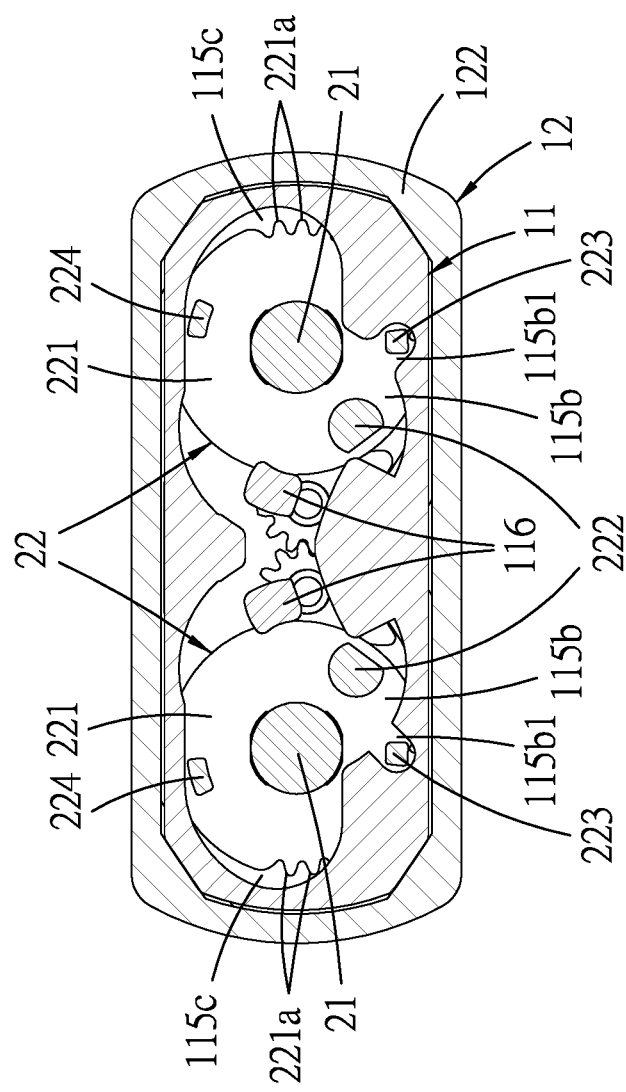
FIG. 14 is a sectional view similar to FIG. 12, illustrating the rotatable axle units in the initial position.

Referring to FIGS. 2, 13 and 14, in the initial position, the support brackets 25 erect in the upright direction to bring the device parts 20 into the closed state and the lateral ends 251 are close to each other to be respectively located above the hinge shafts 21, the guide keys 222 are respectively placed in the lower segments (113a) of the guideways 113, and the hinge shafts 21 are respectively placed in the outer ends (114b) of the shaft sliding slots 114. Additionally, in the initial position, the first stabilizing blocks 223 are respectively placed in the distal ends (115b1), the second stabilizing blocks 224 are placed in the outboard portions (115c), respectively, and the second rotary members 23 are placed in a lower side of the accommodation recess (121a).

When a user opens the foldable electronic device 30 for use, the rotatable axle units 2 are rotated such that the lateral ends 251 are remote from each other, the first rotary members 22 are rotated upwardly and synchronously so that the guide keys 222 are moved upwardly to the inward ends (113b1) of the upper segments (113b), and the second rotary members 23 are rotated about the pivot pins 123 to the first stretched position. During this upward movement of the guide keys 222, since the distance between each hinge shaft 21 and the lower segment (113a) is smaller than that between the hinge shaft 21 and the inward end (113b1) of the upper segment (113b), the hinge shafts 21 are moved inwardly to the inner ends (114a) of the shaft sliding slots 114.

Figure 12:
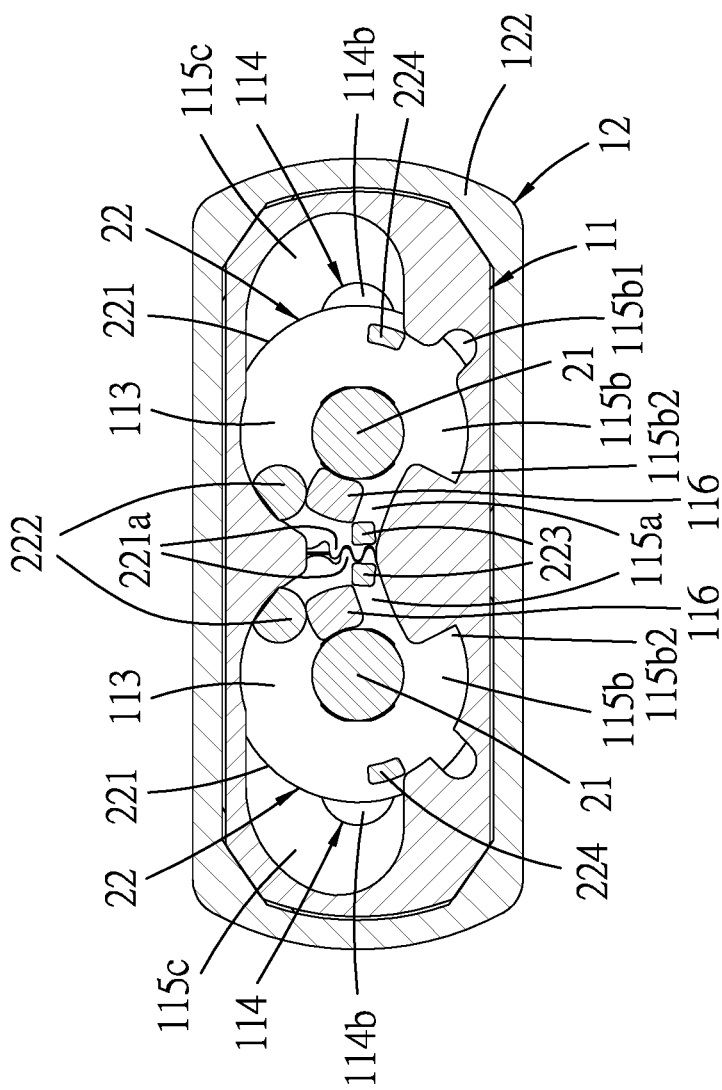
FIG. 12 is a sectional view taken along line XII-XII of FIG. 10, illustrating the rotatable axle units in the first stretched position.

Referring to FIGS. 1, 11 and 12, hence, in the first stretched position, the support brackets 25 are placed horizontally and in the lateral direction to bring the device parts 20 into the first opened state, the guide keys 222 are respectively placed in the inward ends (113b1) of the upper segments (113b) of the guideways 113, the hinge shafts 21 are respectively placed in the inner ends (114a) of the shaft sliding slots 114 to be closer to each other, the first stabilizing blocks 223 are placed in the inboard portions (115a), and the second stabilizing blocks 224 are placed in the outboard portions (115c) and adjacent to the lower portions (115b). Meanwhile, the first stabilizing blocks 223 abut against the abutted blocks 116 so as to restrict movement of the first rotary members 22 toward the outer ends (114b) of the shaft sliding slots 114, respectively. Moreover, the fitted tips (242a) of the frictional plates 24 are engaged in the fit slots 118, respectively, to position the device parts 20 in the first opened state. Through the upward movement of the guide keys 222 to the inward ends (113b1) of the upper segments (113b) of the guideways 113 to bring the hinge shafts 21 to the inner ends (114a), the distance between the device parts 20 is decreased.

The rotatable axle units 2 can be further rotated such that the guide keys 222 are respectively moved outwardly of the engaging holes 232 through the openings 233 to be removed from the second rotary members 23 and moved to the outward ends (113b2) of the upper segments (113b), respectively. During this rotation, the first toothed portions (221a) of the rotary bodies 221 mesh with each other when one of the guide keys 222 is moved in the corresponding upper segment (113b) so as to allow synchronous rotations of the first rotary members 22 in opposite directions and to make the synchronizing movement of the guide keys 222 in the upper segments (113b) of the guideways 113. Meanwhile, during this rotation, the second stabilizing blocks 224 are movably engaged in the lower portions (115b), and the auxiliary stabilizing blocks 225 are movably engaged in a part of the auxiliary stabilizing slots (121c) that is aligned with the lower portions (115b). The undesired movement of the first rotary members 22 toward the outer ends (114b) of the shaft sliding slots 114 can be restricted by means of the second stabilizing blocks 224 and the auxiliary stabilizing blocks 225. It is noted that the guide key 222 is in the form of a cylinder having a longitudinal section (222a) which extends in the axial direction, and has a cylinder diameter larger than the width of the opening 233. The guide keys 222 are allowed to be removed from the second rotary members 23 through the openings 233 only when engaged in the inward ends (113b1) of the upper segments (113b) of the guideways 113 such that disengagement of the guide keys 222 from the second rotary members 23 during movement to the first stretched position can be prevented.

Figure 16:
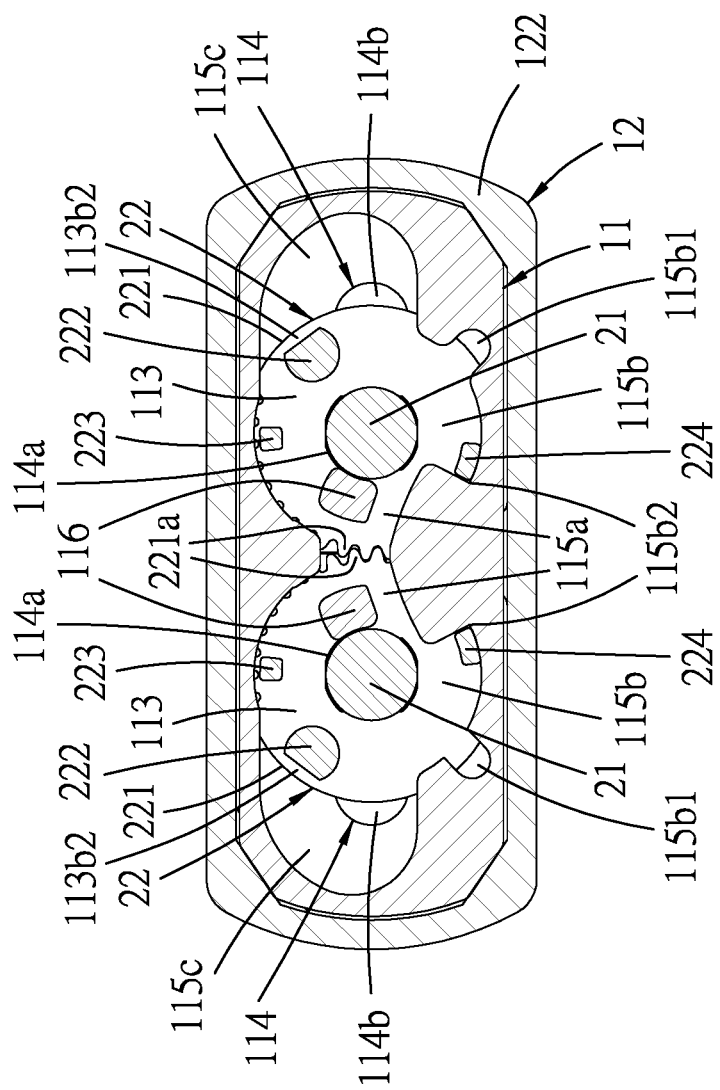
FIG. 16 is a sectional view similar to FIG. 12, illustrating the rotatable axle units in the second stretched position.

Referring to FIGS. 15 and 16, in the second stretched position, the support brackets 25 erect in the upright direction and the lateral ends 251 are close to each other to be respectively located below the hinge shafts 21 to bring the device parts 20 into the second opened state, the guide keys 222 are respectively placed in the outward ends (113b2) of the upper segments (113b) of the guideways 113, and the hinge shafts 21 are respectively placed in the inner ends (114a) of the shaft sliding slots 114. Meanwhile, the second stabilizing blocks 224 are stopped in the proximal ends (115b2) of the lower portions (115b) to stop rotation of the first rotary members 22 so as to keep the rotatable axle units 2 in the second stretched position. Thus, the device parts 20 are allowed to be turned from 0 to 360 degrees to each other.

As illustrated, with the rotatable axle units 2 rotatable between the initial position and the first stretched position, the rotation of the hinge shafts 21 rotates the first rotary members 22, and hence brings the second rotary members 23 into pivot rotation, which in turn moves the hinge shafts 21 along the shaft sliding slots 114 so as to generate an appropriate distance between the device parts 20 for use.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A hinge comprising:
   a base frame unit including a base seat that has a first major surface to which an axial direction is normal, and a protective cover which is mounted on an outer peripheral surface of said base seat to cover and conceal said first major surface, said base seat having two guideways which are recessed from said first major surface and formed opposite to each other in a lateral direction that is transverse to the axial direction, and two shaft sliding slots each of which penetrates through said first major surface in the axial direction, each of said guideways including lower and upper segments which are opposite to each other in an upright direction that is transverse to both the axial direction and the lateral direction and which are located below and above a respective one of said shaft sliding slots, respectively, each of said shaft sliding slots extending in the lateral direction and having an inner end and an outer end, said protective cover having a base wall which faces and is spaced apart from said first major surface of said base seat in the axial direction, and two pivot pins which extend from said base wall toward said base seat; and
   two rotatable axle units rotatably extending through said base seat, each of said rotatable axle units including a hinge shaft which extends in the axial direction and through a respective one of said shaft sliding slots to have first and second shaft end portions that are respectively disposed at two opposite sides of said first major surface, a first rotary member which is non-rotatably fitted to said first shaft end portion of said hinge shaft, a second rotary member which is connected with said first rotary member, and a support bracket which is non-rotatably fitted to said second shaft end portion of said hinge shaft and which extends outwardly and in the lateral direction to have a lateral end, said first rotary member having a rotary body, and a guide key which extends from said rotary body in the axial direction and which is slidably engaged in a respective one of said guideways, said second rotary member having a pivot hole which extends in the axial direction for rotatably receiving a respective one of said pivot pins, and an engaging hole which extends in the axial direction for receiving said guide key; said rotatable axle units being rotatable relative to said base frame unit between an initial position, where said support brackets erect in the upright direction and said lateral ends are respectively located above said hinge shafts, said guide keys are respectively placed in said lower segments of said guideways, and said hinge shafts are respectively placed in said outer ends of said shaft sliding slots, and a first extended position, where said support brackets are placed horizontally and in the lateral direction and said lateral ends are remote from each other, said guide keys are respectively placed in said upper segments of said guideways, and said hinge shafts are respectively placed in said inner ends of said shaft sliding slots.

2. The hinge as claimed in claim 1, wherein each of said second rotary members has a second toothed portion formed on a part of an outer periphery that surrounds said pivot hole, said second toothed portions of said second rotary members meshing with each other so as to allow synchronous rotations of said second rotary members in opposite directions and about said pivot pins, respectively, and to stabilize synchronous rotations of said first rotary members through engagement of said guide keys with said engaging holes between the initial position and the first stretched position.

3. The hinge as claimed in claim 2, wherein each of said second rotary members has an opening which is formed laterally of and in spatial communication with said engaging hole, said upper segment of each of said guideways having an inward end and an outward end opposite to each other in the lateral direction such that said guide keys are respectively placed in said inward ends when said rotatable axle units are in the first extended position, said rotatable axle units being further rotatable relative to said base frame unit between the first extended position and a second extended position, where said support brackets erect in the upright direction and said lateral ends are close to each other to be respectively located below said hinge shafts, said guide keys are respectively moved outwardly of said engaging holes through said openings to be removed from said second rotary members and placed in said outward ends, respectively, and said hinge shafts are respectively placed in said inner ends of said shaft sliding slots.

4. The hinge as claimed in claim 3, wherein said rotary body of each of said first rotary members has a first toothed portion formed on apart of an outer periphery thereof, said first toothed portions of said rotary bodies meshing with each other, during rotation of said rotatable axle units between the first extended position and the second extended position, so as to allow the synchronous rotations of said first rotary members in opposite directions.

5. The hinge as claimed in claim 3, wherein said base seat has two stabilizing slots recessed from said first major surface and each having an inboard portion adjacent to and inwardly of said inner end of a respective one of said shaft sliding slots in the lateral direction, and a lower portion below said respective shaft sliding slot, and two abutted blocks respectively disposed in said inboard portions of said stabilizing slots, each of said first rotary members further having a first stabilizing block which extends from said rotary body toward said first major surface and which is movably engaged in a respective one of said stabilizing slots, said first stabilizing block being placed in said inboard portion and abutting against a respective one of said abutted blocks when said rotatable axle units are in the first extended position so as to restrict movement of said first rotary members toward said outer ends of said shaft sliding slots, respectively.

6. The hinge as claimed in claim 5, wherein each of said stabilizing slots further has an outboard portion adjacent to and outwardly of said outer end of said respective shaft sliding slot, said lower portion of each of said stabilizing slots having a distal end and a proximal end opposite to each other in the lateral direction, each of said first rotary members further having a second stabilizing block which extends from said rotary body toward said first major surface and which is angularly spaced apart from said first stabilizing block to be movably engaged in said respective stabilizing slot, wherein said first stabilizing blocks are respectively placed in said distal ends when said rotatable axle units are in the initial position, during the rotation of said rotatable axle units between the initial position and the first extended position, said second stabilizing blocks are movably engaged in said outboard portions, respectively, and said second stabilizing blocks are movably engaged in said lower portion during the rotation of said rotatable axle units from the first extended position to the second extended position, and are stopped in said proximal ends to keep said rotatable axle units in the second stretched position so as to restrict movement of said first rotary members toward said outer ends of said shaft sliding slots, respectively.

7. The hinge as claimed in claim 6, wherein said protective cover has an accommodation recess which is recessed from said base wall for said second rotary members to be rotatably received therein, two auxiliary shaft sliding slots which are configured to respectively mate and be aligned with said shaft sliding slots, and two auxiliary stabilizing slots which are configured to respectively mate and be aligned with said stabilizing slots, said first shaft end portion of each of said hinge shafts further extending from said rotary body toward said protective cover and being movably engaged in a respective one of said auxiliary shaft sliding slots, said rotary body of each of said first rotary members further having an auxiliary stabilizing block which extends toward said base wall of said protective cover, which is aligned with said second stabilizing block in the axial direction, and which is movably engaged in a respective one of said auxiliary stabilizing slots.

8. The hinge as claimed in claim 3, wherein said guide key of said first rotary member is in form of a cylinder having a longitudinal section which extends in the axial direction.

9. The hinge as claimed in claim 1, wherein each of said rotatable axle units further includes at least one frictional plate which is sleeved on said hinge shaft and is interposed between said base seat and said support bracket.

10. The hinge as claimed in claim 9, wherein said base seat further has a second major surface opposite to said first major surface in the axial direction, an accommodation chamber which is recessed from said second major surface for accommodating said frictional plate of said rotatable axle units, and two fit slots which are formed in said accommodation chamber, said frictional plate having a pad body and at least one elastomeric arm portion which is connected with said pad body, said elastomeric arm portion being formed with a fitted tip which is engaged in a respective one of said fit slots.

11. The hinge as claimed in claim 9, wherein each of said hinge shafts has a guided portion and a sleeved portion which are interposed between said first and second shaft end portions and adjoined with each other, said guided portion being slidably inserted into said respective shaft sliding slot, said frictional plate being sleeved on said sleeved portion.

* * * * *